United States Patent

Lühmann et al.

[11] Patent Number: 6,004,665
[45] Date of Patent: Dec. 21, 1999

[54] ADHESIVE TAPE

[75] Inventors: Bernd Lühmann, Norderstedt; Andreas Junghans, Hamburg, both of Germany

[73] Assignee: Beiersdorf AG, Germany

[21] Appl. No.: 08/976,554

[22] Filed: Nov. 24, 1997

[30] Foreign Application Priority Data

Nov. 30, 1996 [DE] Germany .............................. 196 49 729

[51] Int. Cl.⁶ ...................................................... B32B 7/12
[52] U.S. Cl. .................................... 428/317.3; 428/317.1; 428/317.7; 428/343; 428/355 BL
[58] Field of Search .......................... 428/317.3, 355 BL, 428/317.1, 317.7, 343

[56] References Cited

U.S. PATENT DOCUMENTS

| 4,024,312 | 5/1977 | Korpman ................................. 428/343 |
| 5,128,187 | 7/1992 | Polski .......................... 428/355 BL X |
| 5,409,189 | 4/1995 | Lühmann .............................. 248/205.3 |
| 5,491,012 | 2/1996 | Lühmann ................................... 428/40 |
| 5,503,927 | 4/1996 | Ragland et al. .................. 428/317.3 X |
| 5,516,581 | 5/1996 | Kreckel et al. ...................... 428/317.3 |
| 5,626,931 | 5/1997 | LüHmann .............................. 428/40.1 |
| 5,626,932 | 5/1997 | Lühmann ............................... 428/40.1 |

FOREIGN PATENT DOCUMENTS

| WO92/11332 | 7/1992 | WIPO . |
| WO92/11333 | 7/1992 | WIPO . |
| WO93/01979 | 4/1993 | WIPO . |
| WO94/21157 | 9/1994 | WIPO . |
| WO95/06691 | 3/1995 | WIPO . |

OTHER PUBLICATIONS

DE 3331016 Abst.
DE 19511288 Abst.
DE 4233872 Abst.
DE 4222849 Abst.
DE 4428587 Abst.
DE 4431914 Abst.

*Primary Examiner*—Daniel Zirker
*Attorney, Agent, or Firm*—Sprung Kramer Schaefer & Briscoe

[57] ABSTRACT

Adhesive tape for a bond which can be redetached by pulling without residue and without damage, having a foam backing coated on one or both sides with a self-adhesive composition, characterized in that a) on at least one of the two sides of the foam backing there is applied a self-adhesive composition whose ratio of tear strength to stripping force (peel force) at a peel angle of less than 10° to the bond surface is greater than 1.2:1, b) the elongation at break of the adhesive tape is greater than the elongation at break of the foam backing, and c) the foam backing tears during the redetachment of the bond by pulling (stripping).

13 Claims, No Drawings

ADHESIVE TAPE

The invention relates to an adhesive tape for a bond which can be redetached by pulling, without residue or damage, and to its use.

Highly extensible elastic adhesive films for redetachable bonds, which are redetachable by pulling essentially in the direction of the bond plane, are known and are obtainable commercially under the designation "tesa power-strips". Bonds produced therewith offer a powerful hold and yet can be released again without trace and without damage to the substrate or to the adherends, as is described in DE 33 31 016 C2. DE 4.222.849, DE 4.233.872, DE 4.428.587, DE 4.431.914 and DE 195 11 288 describe, inter alia, specific embodiments and applications of prior adhesive films.

Multilayer adhesive films which comprise highly extensible film backings of low elasticity, or highly extensible, elastic film backings, and uses of the same adhesive films, are likewise known, for instance from U.S. Pat. No. 4,024,312 "Pressure-sensitive adhesive tape for medical use— having an extensible, elastic block copolymer backing", WO 92/11332 "Removable adhesive tape" (PSA tape using highly extensible backing with photopolymerized acrylic PSA), WO 92/11333 "Removable adhesive tape" (PSA tape using highly extensible essentially inelastic backing), WO 93/01979 "Securing stacks with stretch adhesive tape", and WO 94/21157 "Article support using stretch releasing adhesive".

WO 92/11333, for instance, describes an adhesive tape which can be released again by pulling in the bond plane and which uses as its backing a highly stretchable, essentially non-resilient (non-elastomeric) film having a resilience after stretching of < about 50%. U.S. Pat. No. 4,024,312 describes correspondingly deadhering self-adhesive tapes which are essentially elastomeric in nature.

In practice it is found that it is possible in general to achieve high bond strengths with the abovementioned self-adhesive tapes on smooth and firm substrates. On rough substrates the bond strength, especially for thin products but also for self-adhesive tapes of relatively high layer thickness, is inadequate for many applications. The apparent reason for the inadequate bond strength is primarily an insufficient bond area, caused by insufficient conformability of the adhesive tapes to rough and irregular surfaces, especially when two rough substrates are to be bonded to one another. For example, when planar materials are bonded by means of tesa power-strips to coated woodchip wallpaper at the pressures customarily employed for press-on application (100 N/7.4 cm$^2$), bond areas of only about 10% to 40of the adhesive area are often achieved. However, even when bonding onto smooth planar surfaces, an inadequate bond area may be the reason for deficient bond strength. The cause is probably the inclusion of air bubbles in the bond areas. Such air bubbles can often not be removed completely even by means of high application pressures. In adverse cases, bonds having such air inclusions may be the cause of drastically reduced bond strengths relative to samples bonded over the whole area and without air bubbles.

U.S. Pat. No. 5,516,581 and WO 95/06691 describe self-adhesive tapes which are redetachable by extension substantially in the bond plane and whose backings comprise polymeric foams. In particular, WO 95/06691 describes how, by using backing materials comprising polymer foams, it is possible to obtain self-adhesive tapes which can be redetached by stretching and which have a markedly improved conformity to rough and irregular surfaces. As a consequence of the resulting increase in bond area, these products can be used to achieve high bond strengths even on rough and irregularly shaped substrates.

The foam backings described in U.S. Pat. No. 5,516,581 and WO 95/06691, however, have a number of serious disadvantages:

The foam backings employed are exclusively those which do not tear when the adhesive tapes are being detached again. Such tear-proof backings, however, require a multicoat structure which is in some cases very complex; cf. claims 13, 14, 17 in U.S. Pat. No. 5,516,581 and claims 4, 15 in WO 95/06691.

Single-layer foam backings are of only limited use:
Single-layer foam backings according to claim 1 of WO 95/06691 have a minimum thickness of at least 30 mils=760 $\mu$m.

Single-layer foam backings according to claim 1 in WO 95/06691 are limited, furthermore, in that only those having a modulus of elasticity (Young's modulus) < about 2400 psi=16.9 MPa are suitable.

The resilience of the adhesive tapes described in U.S. Pat. No. 5,516,581 is in all cases < about 50% after the redetachment process. Adhesive tapes having a markedly elastic resilience, therefore, cannot be employed in accordance with the invention. The same applies to the backing materials used in WO 95/06691 (WO 95/06691; page 3, lines 12, 13).

The great majority of the polymer foams which have become established and are obtainable on the market are therefore unsuitable as a material for use in the abovementioned application.

The object of the present invention was to overcome the abovementioned disadvantages, and in particular to realize self-adhesive tapes which are redetachable by stretching essentially in the bond plane and which are able to utilize as backings the broad range of foams present on the market. However, such foams would tear in the course of the detachment process under the high tear extension required for the detachment process. Consequently, it was to be ensured that the residueless and non-destructive detachment process is not thereby restricted.

This is achieved by means of adhesive tapes as characterized in more detail in the claims, especially those having backings comprising polymer foams which give the self-adhesive tapes comprising them an improved conformability to rough substrates, where:

corresponding backings tear in the course of the detachment process of the self-adhesive tapes, in combination with:

pressure-sensitive adhesive compositions whose high tear strength coupled with high extension allows residueless and non-destructive redetachment of the self-adhesive tapes comprising them by stretching, in particular in the bond plane.

The possibility of being able to employ foam backings which tear during the detachment process for self-adhesive tapes which are redetachable without residue and without destruction by stretching, in particular in the bond plane, means that a very large selection of foams is available for this application. In this way it is possible to realize self-adhesive tapes having a broad spectrum of use on the basis of inexpensive raw materials.

Through the nature and layer thickness of the pressure-sensitive adhesive compositions used it is possible to control, within wide ranges, the detachment forces (stripping forces) of self-adhesive tapes according to the invention. Since the force necessary for stretching the backing is an important co-determinant of the detachment forces required for deadhesion by stretching, it can be assumed that the stripping forces for self-adhesive tapes according to the invention will be correspondingly lower than those of the tapes described in U.S. Pat. No. 5,516,581 and WO 95/06691, with identical stretching behaviour in the region below the tear extension of the foam backing used, which constitutes a considerable advantage for the user.

The foam backings described in U.S. Pat. No. 5,516,581 and WO 95/06691 must possess the high tear strength and extensibility required for the process of detachment by stripping throughout their lifetime. If ageing results in a reduction in the abovementioned parameters, then the residueless detachment process is threatened. This is not the case for adhesive tapes according to the invention, since in this case the residueless redetachment process is determined by the profile of properties of the pressure-sensitive adhesive compositions used and not by the mechanical properties of the backing films which are utilized.

In the case of bonding onto rough and highly sensitive substrates, such as coated woodchip wallpaper, it is found that self-adhesive tapes according to the invention allow uniform stressing of the bond substrates as a consequence of the high bond area. The result of this is markedly fewer instances of destruction of the substrates on redetachment, for instance in the form of paint which has been torn away, and a much greater load capacity.

Exemplary Applications

Self-adhesive tapes which can be redetached without residue and without destruction for:

Original closure applications, single- and double-sided adhesive.

The fixing of posters, pictures, calendars, postcards, signs, self-adhesive hooks, including those which are ready-made, labels, for example price recommendation labels, generally, for joining materials which are to be parted again at a later point in time, damping elements, insulating elements, sealing elements.

Self-adhesive Compositions

The self-adhesive compositions used are preferably those based on block copolymers comprising polymer blocks formed from vinylaromatic compounds (A blocks), preferably styrene, and those formed by polymerization of 1,3-dienes (D blocks), preferably butadiene and isoprene. Both homo- and copolymer blocks can be used in accordance with the invention. Resulting block copolymers may contain identical or different D blocks, which can be partially, selectively or completely hydrogenated. Block copolymers can have a linear A-D-A structure. It is also possible to employ block copolymers of radial design, and star-shaped and linear multiblock copolymers. Further components present can be A-D diblock copolymers. Block copolymers can be modified, for example functionalized by reaction with maleic anhydride. Block copolymers of vinylaromatic compounds and isobutylene can likewise be employed in accordance with the invention. All of the abovementioned polymers can be used alone or in a mixture with another. Typical use concentrations for the styrene block copolymers in the range between 15% by weight and 75% by weight, preferably in the range between 30% by weight and 60% by weight and, with particular preference, in the range between 35% by weight and 55% by weight.

Particularly suitable tackifiers are: rosin and its derivatives, aliphatic, aromatic-modified aliphatic, aromatic and phenol-modified tackifier resins, to name but a few. The concentrations in which the resins are employed are typically in the range between 15% by weight and 75% by weight, preferably in the range between 30% by weight and 65% by weight and, with particular preference, in the range between 35% by weight and 60% by weight. In the case of the use of rosin and its derivatives it is preferred to employ esters of partially or fully hydrogenated rosin.

As endblock-compatible resins (resins compatible primarily with the vinylaromatic blocks) it is possible to use homo- and copolymers of vinylaromatic compounds, for example styrene or α-methylstyrene, polyphenylene oxides, or phenylene oxide-modified resins.

Further optimum blend components comprise plasticizer oils and liquid resins (use concentrations between 0 and max. about 35by weight), fillers (reinforcing and non-reinforcing), e.g. silica, especially synthetic silica, glass (ground or in the form of beads), aluminas, zinc oxides, calcium carbonates, titanium dioxides, carbon blacks, to name but a few, anti-ageing agents (primary and secondary antioxidants, light stabilizers, anti-ozonants, metal deactivators, etc.). Blend components likewise comprise polymers which effect, in particular, the ozone resistance of block copolymers, for example polyvinyl acetates and ethylene-vinyl acetate copolymers.

Other polymers which can be present are natural and synthetic polymers such as, for example, natural rubber, synthetic polyisoprenes, polybutadienes, polychloroprenes, SBR, Kraton liquid (Shell Chemicals), low molecular mass styrene-diene block copolymers, for example Kraton LVSI 101, polyisobutylenes, etc., which can replace up to about 50% by weight of the vinylaromatic-containing block copolymers.

The self-adhesive compositions used in accordance with the invention can be crosslinked chemically, especially by radiation-chemical means (for example by UV irradiation, γ irradiation or by irradiation with rapid electrons).

Adhesive compositions according to the invention are optionally those whose tackiness is brought about only by thermal activation.

In addition to the self-adhesive compositions described above which are based on vinylaromatic-containing block copolymers, other suitable self-adhesive compositions are those which have sufficient tear strength and cohesion for the detachment process and which at the same time have a maximum extension which is higher than the elongation at break of the foam backings employed. Such pressure-sensitive adhesive compositions can be employed alone or in combination with those based on vinylaromatic-containing block copolymers. Examples of compounds suitable in accordance with the invention are adhesive acrylate copolymers copolymerized with macromonomers, the macromonomers having a glass transition temperature of >+40° C. The high tear strength of such copolymers is probably achieved by the association of the macromonomers. Examples of suitable macromonomers are methacryloyl-terminated polymethyl methacrylates.

Foams

Foams (foam backings) according to the invention are, in particular, homo- and copolymers of ethylene, especially polyethylenes of low and very low density (LDPE, LLDPE, VLDPE), ethylene-vinyl acetate copolymers, and mixtures of the abovementioned polymers. Further polymers may include: polyvinyl acetates, polypropylenes, EPDM, thermoplastic elastomers based on styrene block copolymers, polyurethanes based on aromatic and aliphatic diisocyanates, PVC, polychloroprenes, natural rubber, acrylate copolymers. Foams can be employed in crosslinked or non-crosslinked form.

The thicknesses of the foams employed are, in particular, between 175 μm and 30 mm, preferably between 250 μm and 7 mm. Densities are in particular from 20 to 500 kg/m$^3$, preferably from 30 to 300 kg/m$^3$. The foam structure can be a closed-cell, open-cell or mixed-cell one. It is possible to use foams of integral or nonintegral structure, with or without a skin. Likewise suitable for use in accordance with the invention are laminates of two or more foams. The elongation at break of the foams employed is smaller than the elongation at break of the self-adhesive composition which determines the tear strength.

Anchoring of the Self-adhesive Compositions to the Foams

To produce a sufficient anchorage of the pressure-sensitive adhesive compositions that are employed to the foams, the latter are advantageously subjected to a pressure pretreatment in the course of foam production and/or prior to coating. Suitable pretreatment processes include chlorine pretreatment, corona pretreatment, plasma treatment and flame pretreatment, the latter in particular by means of an electrically polarized flame. Pretreatment methods can be employed alone or in combination. In the case of foams with a skin and integral foams, the foam can be primed in order to improve still further the anchorage of the adhesive composition.

Open-celled and mix-celled foams can be subjected to impregnation. Between the foam and the pressure-sensitive adhesive compositions it is possible, optionally, to integrate a barrier layer in order to reduce the passage of migratable materials between pressure-sensitive adhesive compositions and backings.

Adhesive Tapes

Adhesive tapes according to the invention comprise at least one foam backing which is equipped on one or both sides with a self-adhesive composition. The adhesive composition is of sufficient elongation at break and tear strength to enable such self-adhesive tapes to be redetached from the bond substrates without residue and without destruction by stretching in particular in the bond plane. Self-adhesive compositions can be identical or different in formulation, may cover the foam over its entire area or partly, for instance in a strip, and can be applied with an identical or different amount on both sides of the adhesive tape. Adhesive compositions can be composed of one or more layers of adhesive composition. For example, an adhesive layer can consist of two strata both of which use vinylaromatic-containing block copolymers but where the block copolymers are different. In addition, an adhesive layer based on natural rubber or polybutadiene or polyisobutylene or "Kraton liquid" (Shell Chemicals) or mixtures of the abovementioned polymers can be applied to a first adhesive layer comprising vinylaromatic-containing block copolymers.

In accordance with the invention it is also possible to employ those double-sided contact-adhesive tapes which can be redetached without residue from the substrate only on one side. Such adhesive tapes are characterized in that they carry on one side a pressure-sensitive adhesive composition which is characterized by a sufficiently high tear strength and elongation of break for the detachment process. For the second side it is possible to choose a pressure-sensitive adhesive composition which does not have a tear strength and/or elongation at break sufficient for redetachment without residue.

The adhesive tapes according to the invention are characterized in particular in that their elongations at break are greater than 200%, preferably greater than 350% and, with particular preference, greater than 450%. The elongation at break of the adhesive tape is higher than the elongation at break of the foam backing employed.

The tear strengths of the pressure-sensitive adhesive compositions used are in particular greater than 1.5 MPa, preferably greater than 3 MPa and, with particular preference, greater than 5 MPa.

Layer thicknesses of the self-adhesive compositions which determine the tear strength are in particular ≧10 μm, preferably ≧150 μm and, with particular preference, ≧200 μm.

The ratio of tear strength to stripping force of the self-adhesive tapes at peel angles of <10° relative to the bond surface is greater than 1.2:1, preferably greater than 1.5:1, and, with particular preference, greater than 2:1.

Manufacturing Form

Manufacturing forms of adhesive tapes according to the invention include both rolls of adhesive tape and sections of adhesive tape of defined dimensions, for example in the form of punched sections. Adhesive tape sections of defined dimensions may optionally have a shaped end in accordance with DE 4.428.587, for instance an end which comes together as a point, or may be equipped, in accordance with DE 4.431.914, with a release-coated grip-tab film or with coated release paper.

Production

Adhesive tapes according to the invention can be produced by solyent coating, cold- or hot-lamination and by melt coating of the foams that are to be used. For layer thicknesses > about 75 μm, lamination or melt coating is preferred on economic grounds.

Test Methods

Maximum tensile strength, elongation at break.

The measurements are carried out in accordance with DIN 53504 using standard test specimens of size S 2 at a separation rate of 300 mm/min.

Modulus of Elasticity

The modulus of elasticity is determined in accordance with ASTM D 882 with the following test-specimen dimensions: length of test strip=140 mm; clamped length (distance between clamping jaws)=100 mm; width of test strip =15 mm. Separation rate=25.4 mm/min.

Tip Shear Strength

To determine the tip shear strength, the adhesive film to be tested, which measures 20 mm*50 mm, and is provided at one end on both sides with a non-tacky grip-tab region (obtained by laminating on 25 μm thick biaxially oriented polyester film measuring 20 mm*13 mm (Hostaphan RN 25)), is bonded to the centre of a highly polished square steel plate measuring 40 mm*40 mm*3 mm (length*width*thickness). On its back the steel plate is provided centrally with a 10 cm long steel rod which sits vertically on the surface of the plate. The test specimens obtained are bonded to the test substrate with a force of 10ON (press-on time=5 s) and are left in the unloaded state for 5 minutes. After setting the chosen tip shear load by suspending a weight (lever arm and mass of the weight are selectable), the time that elapses before the bond fails is measured.

Detachment Force (stripping force)

To determine the detachment force (stripping force) an adhesive film measuring 50 mm*20 mm (length*width) with a non-tacky grip-tab region (see above) at the top end is bonded between two steel plates (arranged so as to overlap one another precisely) measuring 50 mm×30 mm, in accordance with the procedure described under "Tip shear strength" but with application pressures of 500 N in each case. The steel plates each carry at their lower end a bore for accommodating an S-shaped steel hook. The lower end of the steel hook carries a further steel plate, by means of which the test set-up can be fixed into the lower clamping jaw of a tensile tester for measurement. The bonds are stored at +40° C. for 24 h. After reconditioning to RT, the adhesive film strip is pulled out parallel to the bond plane at a traction rate of 1000 mm/min. During this procedure the detachment force (stripping force) required is measured in N/cm. Finally, the steel plates are checked for residues of adhesive composition.

Bond Area on Glass

Adhesive film strips measuring 20 mm×50 mm are bonded centrally onto a planar steel substrate measuring 200 mm×100 mm. The resulting assembly is bonded vertically and with precise overlap on a glass plate of the same dimensions and is pressed on with a force of 100 N applied uniformly and centrally. The pressing time is 5 s. The measurement is carried out in triplicate. The bond area obtained on the glass surface is determined visually and expressed as a percentage of the area of the adhesive film.

Bond Area on Woodchip Wallpaper

To determine the bond area on rough substrates, adhesive film strips measuring 20 mm×50 mm are bonded centrally to a planar steel substrate measuring 200 mm×100 mm. The resulting assembly is bonded vertically and with precise overlap to a coated woodchip wallpaper (wallpaper: Erfurt Körnung 52; colour: Herbol Zenit LG; wallpaper bonded to compression chipboard) having the same dimensions which has been given a thin powdering of aluminium bronze and is pressed on with a force of 100 N applied uniformly and centrally. The pressing time is 5 s. The measurement is carried out in triplicate. Samples can readily be lifted vertically from the powdered woodchip wallpaper. The bond area obtained is determined visually by means of the aluminium bronze which has been transferred to the surface of the adhesive film and is expressed as a percentage of the surface area of the adhesive film.

Testing for Residueless and Non-destructive Redetachment

A corresponding test is carried out as part of the determination of the detachment force (stripping force) (see above) for the substrates steel//steel. For tests for redetachability without residue and without destruction on other substrates as well, for example PMMA//coated woodchip wallpaper (wallpaper, Erfurt Körnung 52; colour: Herbol Zenit LG; wallpaper bonded to compression chipboard), appropriate test specimens are produced, as described above under "detachment force (stripping force)", and the bond is parted (stripped) either mechanically or manually. An assessment is made of whether residues of adhesive composition are present on the bond substrates and, respectively, of whether it is possible to detect instances of destruction of the bond substrates.

EXAMPLE 1

A pressure-sensitive adhesive composition consisting of 20 parts of SBS block copolymer (Vector 8508, Exxon), 80 parts of SIS block copolymer (Vector 4211, Exxon), 100 parts of a penta ester of partially hydrogenated rosin (Foralyn 110, Hercules) and 1 part of a primary antioxidant (Irganox 1010, Ciba Geigy) [=formulation 1] is applied by cold lamination to both sides of the foams listed below. For this purpose the chosen foam is placed on the pressure-sensitive adhesive, which is on siliconized release paper, and then rolled over five times with a rubber-coated steel roller 25 cm wide with an application pressure of 50 N. The intermediate product obtained in this way is coated with pressure-sensitive adhesive on the second side in an identical manner. Tests are carried out after the resulting samples have been conditioned for 24 hours in a climatically controlled chamber (50% relative humidity, T=RT=23° C.). Test specimens (adhesive films) are in all cases punched out transversely to the direction of manufacture of the foam backing used. This results in the following properties:

| Sample designation | Trade name of foam | Type of foam | Manufacturer |
|---|---|---|---|
| 3.003 | PUR/Ester B45 | Polyurethane ester | Otto Bock Kunststoff KG |
| 3.004 | RA 24 | EPDM | Rubber Astic & Co. Ltd. |
| 3.005 | W-Schaum 0.12/4.5/150 | PVC-flexible | Freudenberg |

| Sample designation | Foam thickness in $\mu$m | Density in kg/m$^3$ | Amount of adhesive applied Sides A//B | Adhesive formulation |
|---|---|---|---|---|
| 3.003 | 6000 | 45 | 190//200 g/m$^2$ | [1] |
| 3.004 | 4000 | 60 | 200//200 g/m$^2$ | [1] |
| 3.005 | 4600 | 120 | 200//200 g/m$^2$ | [1] |

| Sample designation | Maximum tensile strength Adhesive film | Elongation at break | Stripping force | Does foam tear on detachment? | Adhesive film strippable without residue or destruction* |
|---|---|---|---|---|---|
| 3.003 | 53 N/cm | 1150% | 16 N/cm | yes | yes |
| 3.004 | 46 N/cm | 1200% | 8.3 N/cm | yes | yes |
| 3.005 | 47 N/cm | 1200% | 13 N/cm | yes | yes |

*Bond substrates = steel//steel and coated woodchip//PMMA

All of the samples can be detached entirely without residue and without destruction from the steel//steel and coated woodchip//PMMA joints. In all cases the foam employed tears but not the pressure-sensitive adhesive compositions used.

EXAMPLE 2

The foams listed below based on polyethylene and, respectively, an ethylene-vinyl acetate copolymer are coated in accordance with Example 1 on one or both sides with the pressure-sensitive adhesive composition of formulation [1]. This results in the following properties:

| Sample designation | Trade name of foam | Type of foam | Manufacturer |
|---|---|---|---|
| 3.012C | Alveolit TA 0400.51 | PE crosslinked | Alveo AG |
| 3.013 | Alveolit TA 0500.5 | PE crosslinked | Alveo AG |
| 3.013e | Alveolit TA 0500.5 | PE crosslinked | Alveo AG |
| 3.015 | Alveolit TA 1000.8 | PE crosslinked | Alveo AG |
| 3.018 | Alveolit TE 1000.8 | EVAc crosslinked | Alveo AG |
| 3.016 | Alveolit TA 1001.6 | PE crosslinked | Alveo AG |
| 3.002 | Alveolit TA 3003 | PE crosslinked | Alveo AG |

| Sample designation | Foam thickness in $\mu$m | Density in kg/m$^3$ | Amount of adhesive applied Sides A//B | Adhesive formulation |
|---|---|---|---|---|
| 3.012C | 510 | 250 | 200//200 g/m$^2$ | [1] |
| 3.013 | 500 | 200 | 190//200 g/m$^2$ | [1] |
| 3.013e | 500 | 200 | 200 g/m$^2$ | [1] |
| 3.015 | 800 | 100 | 200//200 g/m$^2$ | [1] |
| 3.018 | 800 | 100 | 200//200 g/m$^2$ | [1] |
| 3.016 | 1600 | 100 | 200//200 g/m$^2$ | [1] |
| 3.002 | 3000 | 33 | 200//200 g/m$^2$ | [1] |

| Sample designation | Maximum tensile strength Adhesive film | Elongation at break | Stripping force | Does foam tear on detachment? | Adhesive film strippable without residue or destruction* |
|---|---|---|---|---|---|
| 3.012C | 42 N/cm | 1110% | 15.0 N/cm | yes | yes |
| 3.013 | 46 N/cm | 1100% | 14.5 N/cm | yes | yes |

-continued

| | | | | | |
|---|---|---|---|---|---|
| 3.013e | n.m.** | n.m.** | n.m.** | yes | yes |
| 3.015 | 61 N/cm | 1200% | 11.7 N/cm | yes | yes |
| 3.018 | 49 N/cm | 1150% | 12.5 N/cm | yes | yes |
| 3.016 | 57 N/cm | 1200% | 17 N/cm | yes | yes |
| 3.002 | 50 N/cm | 1100% | 9 N/cm | yes | yes |

*Bond substrates = steel//steel and coated woodchip//PMMA
**n.m. = not measured
***Bond substrates = steel, PMMA, coated woodchip; stripped manually at an angle of less than about 10° from the abovementioned substrates with a separation rate of about 3000 mm/min.

All of the samples can be removed completely, without residue and without destruction from the steel//steel and coated woodchip/PMMA joints or, in the case of the sample 3.013e (single-sided) can be detached fully without residue and without destruction from the abovementioned bond substrates. In every case the foam employed tears but not the pressure-sensitive adhesive composition that is used. In the case of the sample 3.012C, 3.013, 3.013e, 3.015 and 3.018 the assembly of foam backing and pressure-sensitive adhesive composition is maintained during the detachment process. The same is not true of the samples 3.002 and 3.016. For the latter materials, a separation of pressure-sensitive adhesive composition and foam backing, or delamination of the foam backing surface, is observed during the detachment process. However, this does not impair the complete, residueless and non-destructive redetachment process.

EXAMPLE 3

A 510 μm thick crosslinked polyethylene foam of density 200 kg/cm³ (Alveolit TA 0400.51; from Alveo) is coated on both sides in accordance with Example 1 with pressure-sensitive adhesive composition consisting of 60 parts of Vector 4211, 40 parts of Vector 4261, 100 parts of Pentalyn H-E (Hercules) and 1 part of Irganox 1010 in different applied amounts (formulation [2]). This results in the following properties:

| Sample designation | Amount of adhesive applied A//B | Adhesive formulation |
|---|---|---|
| 3.012 | 50//60 g/m³ | [2] |
| 3.012A | 100//105 g/m² | [2] |
| 3.012B | 150//150 g/m² | [2] |
| 3.012C-2 | 205//200 g/m² | [2] |
| 3.002D | 305//310 g/m² | [2] |

| Sample designation | Maximum tensile strength | Elongation at break | Stripping force | Does foam tear on detachment? | Adhesive film strippable without residue or destruction* |
|---|---|---|---|---|---|
| 3.012 | 12 N/cm | 1100% | — | yes | no |
| 3.012A | 28 N/cm | 1200% | 13.5 N/cm | yes | yes |
| 3.012B | 42 N/cm | 1200% | 14.5 N/cm | yes | yes |
| 3.012C-2 | 44 N/cm | 1150% | 15.5 N/cm | yes | yes |
| 3.002D | 64 N/cm | 1200% | 17.5 N/cm | yes | yes |

*Bond substrates = steel//steel and coated woodchip//PMMA

Not until an applied amount of adhesive on both sides of about 100 g/m² does the maximum tensile strength of the abovementioned adhesive films exceed their stripping force, so that they can be removed completely, without residue and without destruction, from the joints used. The foam backing used tears in every case and on its own lacks sufficient strength for non-destructive and residueless detachment.

EXAMPLE 4

The foams listed below based on polyethylene and on an ethylene-vinyl acetate copolymer are coated in accordance with Example 1 on both sides with pressure-sensitive adhesive of formulation [1] (see Ex. 1). A test for bond strength is carried out. The following data are measured in comparison with double-sided self-adhesive tapes which do not comprise an intermediate foam backing.

| Sample designation | Trade name of foam | Type of foam | Manufacturer |
|---|---|---|---|
| 3.017 | Alveolit TA 0500.8 | Pe crosslinked | Alveo AG |
| 3.018 | Alveolit TA 1000.8 | EVAc crosslinked | Alveo AG |
| 3.000A | — | — | — |
| 3.000B | — | — | — |

| Sample designation | Foam thickness in μm | Density in kg/m³ | Amount of adhesive applied Sides A//B | Adhesive formulation |
|---|---|---|---|---|
| 3.017 | 800 | 200 | 200//200 g/m² | [1] |
| 3.018 | 800 | 100 | 200//200 g/m² | [1] |
| 3.000A | — | — | 360 g/m² | [1] |
| 3.000B | — | — | 650 g/m² | [1] |

| Sample designation | Area in % on woodchip//on glass | |
|---|---|---|
| 3.017 | about 80% | >95% |
| 3.018 | >95% | about 90% |
| 3.000A | about 30% | 40–50%**** |
| 3.000B | about 40% | 60–70%**** |

| Sample designaton | Tip shear strength*** | Does foam tear on detachment? | Adhesive film strippable without residue or destruction |
|---|---|---|---|
| 3.017 | >25 days | yes | yes |
| 3.018 | >25 days | yes | yes |
| 3.000A | 4–6 days | — | yes |
| 3.000B | 8–12 days** | — | yes |

*Bond substrates = steel//steel and coated woodchip/PMMA
**Woodchip wallpaper splits in the bonded area
***Lever arm = 50 mm; shear load = 5 N
****Extensive air inclusions Adhesive films with an intermediate foam backing which utilize a layer thickness of adhesive composition corresponding approximately to the sum of the layer thicknesses of adhesive layers of adhesive films according to the invention which contain intermediate foam backings have markedly higher bond areas and higher tip shear strengths on rough substrates. The greater bond area achieved in addition effectively suppresses the delamination of substrates which are not very strong, such as the coated woodchip wallpaper in the present case. On smooth substrates there is a marked reduction in the tendency for air bubbles to form in the bond area.

EXAMPLE 5

The following polyethylene foams are coated in accordance with Example 1 on both sides with pressure-sensitive adhesive composition corresponding to formulation 1 and with a pressure-sensitive adhesive composition consisting of 50 parts of natural rubber of K value 145, 50 parts of Foralyn 110 and 1 part of Irganox 1010 [formulation 3] in different applied amounts. This results in the following properties:

| Sample designation | Trade name of foam | Type of foam | Manufacturer |
|---|---|---|---|
| 3.012C | Alveolit TA 0400.51 | PE crosslinked | Alveo AG |
| 3.023 | Alveolit TA 0400.51 | PE crosslinked | Alveo AG |

-continued

| | | | | |
|---|---|---|---|---|
| 3.014 | Alveolit TA 0501.5 | PE crosslinked | Alveo AG | |
| 3.024 | Alveolit TA 0501.5 | PE crosslinked | Alveo AG | |
| 3.023A | Alveolit TA 0400.51 | PE crosslinked | Alveo AG | |
| 5.002 | Alveolit TA 0400.51 | PE crosslinked | Alveo AG | |

| Sample designation | Foam thickness in μm | Density in kg/m³ | Amount of adhesive applid Sides A//B | Adhesive formulation |
|---|---|---|---|---|
| 3.012C | 510 | 250 | 200//200 g/m² | [1] |
| 3.023 | 510 | 250 | 200//45 g/m² | [1]//[3] |
| 3.014 | 1500 | 200 | 200//200 g/m² | [1] |
| 3.024 | 1500 | 200 | 650//45 g/m² | [1]//[3] |
| 3.023A | 510 | 250 | 650//45 g/m² | [1]//[3] |
| 5.002 | 510 | 250 | 45//200//200//45 g/m² | [3]//[1]//[1]//[3] |

| Sample designation | Does foam tear on detachment? | Adhesive film strippable without residue or destruction* |
|---|---|---|
| 3.012C | yes | yes |
| 3.023 | yes | yes |
| 3.014 | yes | yes |
| 3.024 | yes | on one side** |
| 3.023A | yes | yes |
| 5.002 | yes | yes |

*Bond substrates = steel//steel and uncoated woodchip//PMMA
**Adhesive bond can be parted without destruction; NR-based pressure-sensitive adhesive composition remains on one bond substrate; the pressure-sensitive composition based on styrene block copolymer detaches from the substrate without residue.

Adhesive films coated on both sides with pressure-sensitive compositions of high tear strength and high elongation can be redetached completely, without residue and without destruction. The abovementioned samples in which there was delamination of the foam backing and no detachment of the adhesive of the pressure-sensitive adhesive composition from the foam backing in the course of the detachment process can be redetached without residue and without destruction on both sides even when the pressure-sensitive adhesive composition used for the second adhesive film side has a sufficiently high tear strength and elongation break (samples 3.023 and 3.023A). The same does not apply in the present cases for those of the above-described adhesive films in which delamination of the foam backing or detachment of the pressure-sensitive adhesive of low tear strength from the foam backing occurs in the course of the detachment process. However, even these adhesive films can be removed without destruction from the joint.

We claim:

1. An adhesive tape comprising a foam backing which is coated on one or both sides with a pressure sensitive adhesive composition, wherein the pressure sensitive adhesive composition exhibits a ratio of tear strength to stripping force (peel force) of greater than 1.2:1 measured at a peel angle of less than 10° from a surface of a bond formed between said pressure sensitive adhesive composition and a substrate, and wherein the adhesive tape exhibits an elongation at break which is greater than an elongation at break exhibited by the foam backing, the adhesive tape can be redetached from a substrate to which the adhesive tape is bonded without leaving a residue and without damage to the substrate by pulling on the adhesive tape, and the foam backing tears when the adhesive tape is redetached from a substrate by pulling on the adhesive tape.

2. The adhesive tape according to claim 1, wherein the foam backing is coated on both sides with the pressure sensitive adhesive composition.

3. The adhesive tape according to claim 1, wherein the pressure sensitive adhesive composition is based on block copolymers.

4. The adhesive tape according to claim 3, wherein the block copolymers comprise polymer blocks of vinylaromatic compounds.

5. The adhesive tape according to claim 4, wherein the block copolymers comprise polymer blocks of vinylaromatic compounds (A blocks) and polymer blocks formed by polymerization of 1,3-dienes (D blocks).

6. The adhesive tape according to claim 1, wherein the pressure sensitive adhesive composition comprises tackifiers.

7. The adhesive tape according to claim 6, wherein the pressure sensitive adhesive composition further comprises blend components and/or additives.

8. The adhesive tape according to claim 1, wherein the foam backing exhibits an elongation at break which is less than the elongation at break of the pressure sensitive adhesive composition which determines the tear strength of the adhesive tape.

9. The adhesive tape according to claim 1, wherein the pressure sensitive adhesive composition, the foam backing or both the pressure sensitive adhesive composition and the foam backing comprises at least two layers.

10. The adhesive tape according to claim 1, which is in the form of a plurality of sections, wherein one end of each section has a non-tacky grip tab and another end optionally comprises an adhesive area which decreases toward that end.

11. The adhesive tape according to claim 10, wherein the grip tab is formed by laminated-on film sections whose sides in contact with the pressure sensitive adhesive composition comprise a release adhesive finish.

12. In a method comprising bonding an adhesive tape to a substrate and thereafter redetaching said adhesive tape from said substrate by pulling on an end of said adhesive tape, wherein the improvement comprises using as said adhesive tape the adhesive tape according to any one of claims 1–11.

13. The method according to claim 12, which further comprises bonding said adhesive tape to a hook, a base plate or an article which is to be suspended from said substrate, and the adhesive tape is optionally preassembled on said hook, base plate or article.

* * * * *